United States Patent
Harrison et al.

(10) Patent No.: US 12,439,973 B2
(45) Date of Patent: Oct. 14, 2025

(54) VAPORIZATION SYSTEM WITH INTEGRATED HEATERS

(71) Applicant: ZENIGATA LLC, Tacoma, WA (US)

(72) Inventors: Christopher Brent Harrison, Vashon, WA (US); Steven A. Rodriguez, Seattle, WA (US); Michael David Nelson, Seattle, WA (US)

(73) Assignee: Zenigata Inc., Seattle, WA (US)

( * ) Notice: Subject to any disclaimer, the term of this patent is extended or adjusted under 35 U.S.C. 154(b) by 948 days.

(21) Appl. No.: 16/969,925

(22) PCT Filed: Feb. 14, 2019

(86) PCT No.: PCT/US2019/018054
§ 371 (c)(1),
(2) Date: Aug. 13, 2020

(87) PCT Pub. No.: WO2019/161089
PCT Pub. Date: Aug. 22, 2019

(65) Prior Publication Data
US 2021/0030977 A1    Feb. 4, 2021

Related U.S. Application Data

(60) Provisional application No. 62/630,753, filed on Feb. 14, 2018.

(51) Int. Cl.
*A24F 40/65* (2020.01)
*A24F 40/30* (2020.01)
*A24F 40/50* (2020.01)
*A61M 11/04* (2006.01)
(Continued)

(52) U.S. Cl.
CPC .............. *A24F 40/65* (2020.01); *A24F 40/30* (2020.01); *A24F 40/50* (2020.01); *A61M 11/042* (2014.02); *A61M 15/0046* (2014.02); *A61M 15/0065* (2013.01); *A61M 15/06* (2013.01); *A61M 2205/0211* (2013.01);
(Continued)

(58) Field of Classification Search
CPC ................ A24F 40/00; A24F 40/10–42; A24F 40/46–50; A24F 40/57–65; A61M 11/00; A61M 11/04–042; A61M 15/0045–0051; A61M 15/06
See application file for complete search history.

(56) References Cited

U.S. PATENT DOCUMENTS

| | | |
|---|---|---|
| 5,060,671 A | 10/1991 | Counts et al. |
| 5,095,921 A | 3/1992 | Losee et al. |
| 5,144,962 A | 9/1992 | Counts et al. |

(Continued)

OTHER PUBLICATIONS

International Search Report and Written Opinion mailed Apr. 12, 2019, for International Application No. PCT/US2019/018054, 9 pages.

(Continued)

*Primary Examiner* — Rachel T Sippel
(74) *Attorney, Agent, or Firm* — Lee & Hayes, P.C.

(57) ABSTRACT

A system for vaporization of plant-derived concentrates is provided that includes a reusable device that contains electronic features, one or more heaters; and a disposable cartridge that provides an array of concentrate aliquots. Each concentrate aliquot of the array can conveniently be individually addressed by one of the heaters.

13 Claims, 8 Drawing Sheets

(51) Int. Cl.
  *A61M 15/00* (2006.01)
  *A61M 15/06* (2006.01)
(52) U.S. Cl.
  CPC .............. *A61M 2205/3553* (2013.01); *A61M 2205/3633* (2013.01); *A61M 2205/3673* (2013.01)

(56) References Cited

U.S. PATENT DOCUMENTS

| | | | |
|---|---|---|---|
| 5,179,966 A | | 1/1993 | Losee et al. |
| 5,261,424 A | | 11/1993 | Sprinkel, Jr. |
| 5,322,075 A | * | 6/1994 | Deevi .................. A24F 40/46 131/194 |
| 5,372,148 A | | 12/1994 | McCafferty et al. |
| 5,613,505 A | * | 3/1997 | Campbell .............. H05B 6/365 131/194 |
| 5,709,202 A | * | 1/1998 | Lloyd ............... A61M 15/0043 128/200.14 |
| 5,819,756 A | | 10/1998 | Mielordt |
| 6,095,153 A | | 8/2000 | Kessler et al. |
| 6,688,313 B2 | | 2/2004 | Wrenn et al. |
| 6,810,883 B2 | | 11/2004 | Felter et al. |
| 7,997,280 B2 | | 8/2011 | Rosenthal |
| 8,091,558 B2 | | 1/2012 | Martzel |
| 8,550,069 B2 | | 10/2013 | Alelov |
| 8,714,150 B2 | | 5/2014 | Alelov |
| 8,739,786 B2 | | 6/2014 | Postma |
| 8,820,330 B2 | | 9/2014 | Bellinger et al. |
| 8,881,737 B2 | * | 11/2014 | Collett .................. A24F 40/30 131/194 |
| 9,155,848 B2 | | 10/2015 | Emarlou |
| 9,226,525 B2 | | 1/2016 | Liu |
| 10,588,356 B2 | | 3/2020 | Harrison et al. |
| 10,959,464 B2 | | 3/2021 | Harrison et al. |
| 11,666,088 B2 | | 6/2023 | Harrison |
| 11,950,638 B2 | | 4/2024 | Harrison et al. |
| 2004/0020500 A1 | | 2/2004 | Wrenn et al. |
| 2004/0200488 A1 | | 10/2004 | Felter et al. |
| 2012/0048963 A1 | * | 3/2012 | Sharma ............... A61M 11/047 431/255 |
| 2012/0234315 A1 | | 9/2012 | Li et al. |
| 2012/0269497 A1 | | 10/2012 | Hatten |
| 2013/0133675 A1 | | 5/2013 | Shinozaki et al. |
| 2013/0152922 A1 | | 6/2013 | Benassayag et al. |
| 2013/0298905 A1 | | 11/2013 | Levin et al. |
| 2014/0064715 A1 | | 3/2014 | Greim et al. |
| 2014/0150810 A1 | | 6/2014 | Hon |
| 2014/0202454 A1 | | 7/2014 | Buchberger |
| 2014/0224245 A1 | | 8/2014 | Alelov |
| 2014/0251324 A1 | | 9/2014 | Xiang |
| 2014/0261492 A1 | | 9/2014 | Kane et al. |
| 2014/0278258 A1 | | 9/2014 | Shafer |
| 2014/0299141 A1 | | 10/2014 | Flick |
| 2014/0332016 A1 | | 11/2014 | Bellinger et al. |
| 2014/0345635 A1 | | 11/2014 | Rabinowitz et al. |
| 2015/0034103 A1 | | 2/2015 | Hon |
| 2015/0059780 A1 | | 3/2015 | Davis et al. |
| 2015/0090256 A1 | | 4/2015 | Chung |
| 2015/0125136 A1 | | 5/2015 | Sanchez |
| 2015/0136158 A1 | | 5/2015 | Stevens et al. |
| 2015/0150305 A1 | | 6/2015 | Shenkal |
| 2015/0173124 A1 | | 6/2015 | Qiu |
| 2015/0173419 A1 | | 6/2015 | Tu |
| 2015/0216235 A1 | | 8/2015 | Liu |
| 2015/0230521 A1 | | 8/2015 | Talon |
| 2015/0237917 A1 | | 8/2015 | Lord |
| 2015/0245658 A1 | | 9/2015 | Worm et al. |
| 2015/0257448 A1 | | 9/2015 | Lord |
| 2015/0272220 A1 | | 10/2015 | Spinka et al. |
| 2015/0272222 A1 | | 10/2015 | Spinka et al. |
| 2015/0282527 A1 | | 10/2015 | Henry, Jr. |
| 2015/0296885 A1 | | 10/2015 | Liu |
| 2015/0313284 A1 | | 11/2015 | Liu |
| 2015/0351456 A1 | | 12/2015 | Johnson |
| 2015/0359263 A1 | | 12/2015 | Bellinger |
| 2016/0000145 A1 | | 1/2016 | Liu |
| 2016/0000149 A1 | | 1/2016 | Scatterday |
| 2016/0262454 A1 | | 9/2016 | Sears et al. |
| 2017/0035115 A1 | | 2/2017 | Monsees et al. |
| 2017/0156399 A1 | | 6/2017 | Freeman |
| 2017/0215478 A1 | | 8/2017 | Harrison et al. |
| 2017/0231283 A1 | | 8/2017 | Gadas |
| 2017/0303588 A1 | * | 10/2017 | Batista .................. H05B 3/26 |
| 2017/0325442 A1 | | 11/2017 | Kashima et al. |
| 2018/0028993 A1 | | 2/2018 | Dubief |
| 2020/0128875 A1 | * | 4/2020 | Cane ..................... A24F 40/46 |
| 2022/0007712 A1 | | 1/2022 | Harrison et al. |
| 2023/0263215 A1 | | 8/2023 | Harrison |
| 2024/0245109 A1 | | 7/2024 | Harrison et al. |

OTHER PUBLICATIONS

Office Action for U.S. Appl. No. 17/181,871, mailed on Jan. 27, 2022, Harrison, "Vapor Delivery Systems and Methods", 10 pages.
Office Action Dated Jan. 27, 2022 for U.S. Appl. No. 17/181,871, 10 pages.
Office Action Dated Jul. 31, 2020 for U.S. Appl. No. 16/777,750, 4 pages.
Office Action Dated Oct. 19, 2017 for U.S. Appl. No. 15/418,435, 12 pages.
Canadian Office Action mailed Mar. 25, 2024 for Canadian Application No. 3,013,398, a foreign counterpart to U.S. Appl. No. 15/418,435, 16 pages.

* cited by examiner

VAPORIZATION SYSTEM WITH INTEGRATED HEATERS

BACKGROUND

Technical Field

The present disclosure relates generally to a vaporizer system for inhalation of active ingredients derived from plant material. More particularly, the present disclosure relates to a small, portable, and battery powered device that accepts a disposable cartridge printed with an array of aliquots of plant concentrate that is in thermal connection with an array of heaters for selective vaporization of individual aliquots.

Description of the Related Art

A vaporizer is a device used to extract the active ingredients of plant material for inhalation by a human. Vaporization involves heating a material so that its active compounds boil off into a vapor. As opposed to smoking, i.e., burning, vaporization greatly reduces the production of irritating, toxic, and carcinogenic by-products. In addition, little smoke or taste of smoke is present. Studies show that vapor contains substantially zero particulate matter or tar, and, in comparison to smoking, significantly lower concentrations of noxious gases such as carbon monoxide. It has also been shown that, in comparison to other drug delivery methods, such as ingestion, vaporization has a more rapid onset of pharmacological effect, direct delivery into the bloodstream (via the lungs). Vaporization has the potential to allow for a more precise titration, such that the desired level is reached and not exceeded, enabling consistent and appropriate dosage.

Current methods for vaporizing concentrates derived from plant extracts include those that involve a wick and metal coil heating element and those that require heating a substrate with a gas powered torch. Both of these methods can vaporize concentrates in a liquid, semi-solid, and solid state. In addition, other methods involve heating concentrate waxes applied directly to a heater coil (e.g., through the use of a "pen"). Such methods suffer the drawback of fouling of the heater after just a few uses. Portable concentrate vaporization devices typically include the coil and wick system, which is fed by a tank of concentrate fluid or loaded by the user with solid concentrate. These systems are prone to leaking, are limited in number of repeated uses by the wicking rate of the fluid onto the wick, and typically use heating elements containing nickel and/or chromium, which may enter the vapor stream. Furthermore, liquid concentrates are often mixed with propylene glycol to reduce viscosity. Vaporization of propylene glycol has been shown to produce potentially toxic formaldehyde gasses. Alternative systems based on heating a substrate (e.g., a "nail") with a torch are themselves impractical and even unsafe.

From the preceding description, it is apparent that the devices currently being used have significant disadvantages. Thus, important aspects of the technology used in the field of invention remain amenable to useful refinement.

BRIEF SUMMARY

The disclosure provides a system for vaporization that is safer, cleaner, and more convenient to use than known portable vaporizers and provides the added advantage of delivering metered doses of concentrate vapor to the user.

In one aspect, the disclosure provides a system for vaporization of plant-derived concentrates, including a device including electronic features; one or more heaters; and a cartridge including an array of concentrate aliquots, in which each aliquot of the array can be addressed by one of the heaters. In some embodiments, the device provides the one or more heaters while in other embodiments, the cartridge provides the one or more heaters. In certain embodiments, the one or more heaters are formed of a metal, metal alloy, or a semiconductor. In one particular embodiment, the one or more heaters are formed of platinum. In another embodiment, the one or more heaters are configured for precise temperature control by measuring an applied voltage and current, wherein the applied voltage and current are used to calculate a resistance, and wherein the resistance corresponds to a calculable temperature based upon the heater material's known or measured temperature coefficient of resistance. In one embodiment, the system is sized so as to be portable by a user while in another embodiment, the system is configured to be operated on a desktop. In some embodiments, each of the aliquots comprises a known dose of concentrate and/or a known volume and a known percentage of one or more active ingredients. In other embodiments, one or more heaters are formed on a ceramic substrate. In some embodiments, the cartridge provides an air path from a first opening in the cartridge to a second opening in the cartridge. In other embodiments, the cartridge includes means or devices to contain each aliquot of the array. In various embodiments, the cartridge includes a base layer suitable for accepting aliquots that may further include a vapor permeable cover, a removable cover, formed features to accept the aliquots, a cavity forming layer for accepting the aliquots, or the one or more heaters configured to accept the aliquots. In some embodiments, the electronic features include a power source and means or devices to individually control the one or more heaters. In other embodiments, the electronic features may be operably linked to a mobile phone app or to an external device. In yet other embodiments, the system includes more than one heater that can be addressed sequentially or simultaneously to provide for vaporization of a mix of any of the aliquots in a single dose. In other embodiments, the array of concentrate aliquots includes a plurality of aliquot formulations, wherein the plurality of aliquot formulations can be simultaneously, sequentially, or individually vaporized. In other embodiments, the systems of the present disclosure include a machine readable means to identify the composition of the concentrate aliquots and location of the aliquots in the array. In certain embodiments, the machine readable means is programmable and provides for customized aliquot dosing. In other embodiments, each of the aliquots is thermally insulated from adjacent aliquots. In other embodiments, the thermal insulation is provided by an air gap or by a high thermal resistance path formed of a thermally resistant material and/or a thermally resistant substrate geometry. In yet other embodiments, the electronic features of the systems of the present disclosure provide a heating profile for vaporizing each of the aliquots of the array, in which the heating profiles include time and temperature instructions provided to each of the one or more heaters.

In another aspect, the disclosure provides a system for vaporization of plant derived concentrates, including a device including electronic features; a heater; and a cartridge including an array of concentrate aliquots, in which each aliquot of the array is addressable by the heater. In some embodiments, the cartridge is formed in a disc shape and the array of concentrate aliquots is formed in a circular pattern.

In further embodiments, the cartridge is configured to be rotated to position any of the concentrate aliquots in thermal connection with the heater. In other embodiments, the cartridge is formed in a rectilinear shape and the array of concentrate aliquots is formed in a linear pattern on the cartridge. In further embodiments, the cartridge is configured to be moved in a linear direction to position any of the concentrate aliquots in thermal connection with the heater.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and systems described herein may vary as to configuration and as to details. Additionally, the methods may vary as to details, order of the actions, or other variations without departing from the illustrative method disclosed herein.

A vaporizer applies heat to matter such that the active compounds are volatilized into an inhalable or aromatic vapor. Examples of organic plant matter used in vaporizers include Aloe vera, cannabis, chamomile, clove, coffee, eucalyptus, hops, gingko, lemon balm, sage, tea, thyme, and tobacco. Other organic compounds that are inhalable include therapeutic compounds such as medication, supplements, or vitamins. An inhalable therapeutic treatment may be fabricated for vaporization as a solid preparation of the medication or suspended in or applied to a material. Vaporizable matter as used herein refers to any therapeutic or plant matter volatilized to release therapeutic, aromatic or psychoactive compounds for inhalation.

A system for vaporizing (i.e., volatilizing) organic matter (e.g., plant concentrate) is described. The system includes a device, including electronic components, and a cartridge, providing a plurality of aliquots of known doses of concentrate to be inhaled by the user. In certain embodiments, the cartridge may be a disposable, or consumable, feature that may be replaced by a fresh cartridge after use. Each of the concentrate aliquots is individually addressable by (e.g., in thermal connection with) a heating element that may be contained within the device, or, in other embodiments, within the cartridge. The systems of the present disclosure may include an array of more than one heater, or in other embodiments, a single heater. The heaters cause the concentrate aliquots to boil (i.e., vaporize) sequentially or simultaneously, therefore the systems of the present disclosure provides a plurality of dosing options in a self-contained, cartridge. Several alternative embodiments of illustrative systems presented herein are the devices as shown in FIG. 6 through FIG. 10. In certain advantageous embodiments, the devices are conveniently configured to be portable by the user. However, in other embodiments, the devices of the present disclosure may be configured to operate on a desktop.

Figure 1:
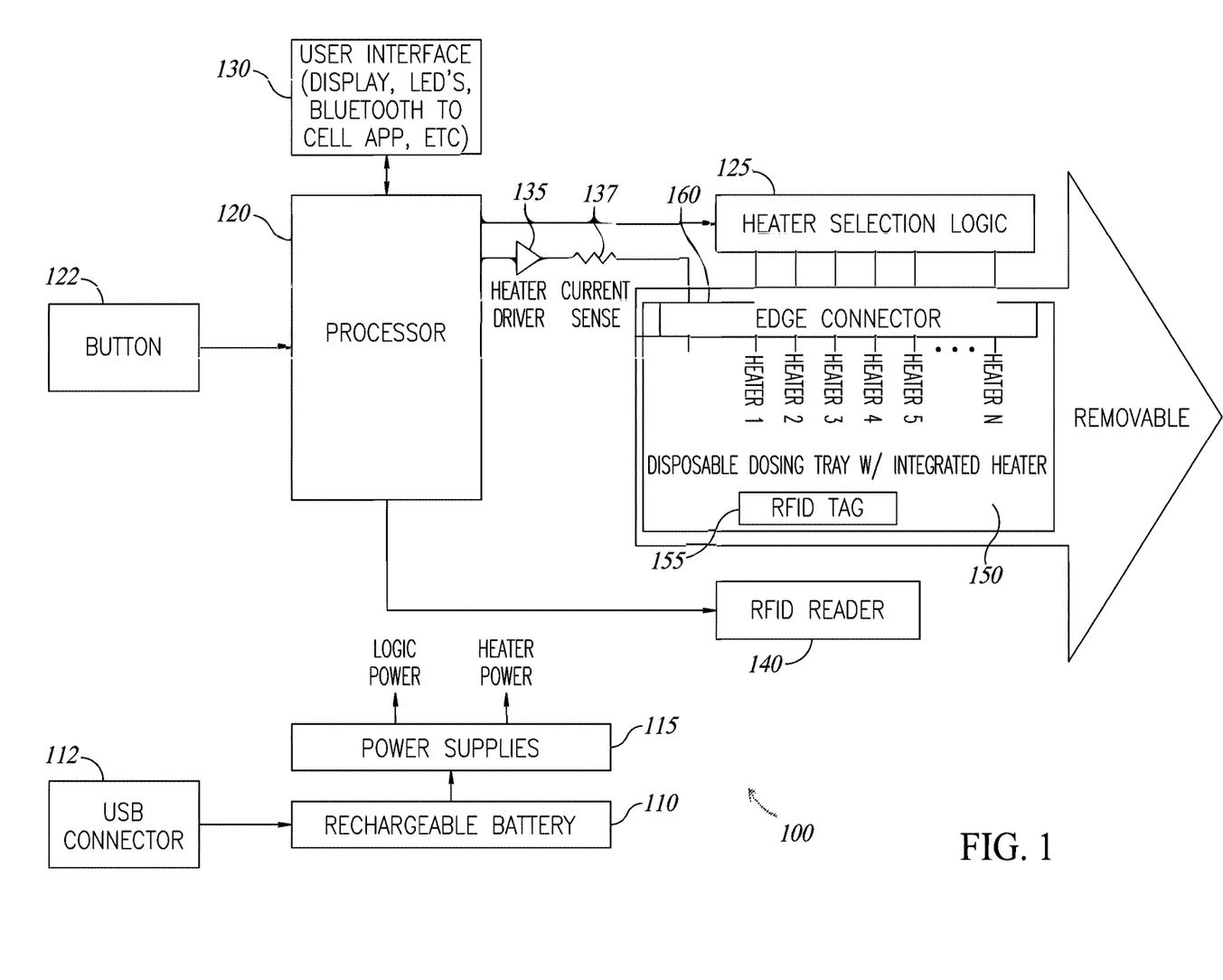
FIG. 1 is a block diagram of one embodiment of a system of the present disclosure.

More generally, the features of the system are summarized by the block diagram presented in FIG. 1. In one embodiment, the electronic components of system 100 include a power source, herein provided by a battery 110, a processor 120, which is controlled by the user by a button 122, a user interface 130, a heater driver 135, a current sensor 137, and a RFID reader 140. The battery may be rechargeable by a USB connector 112. The battery is in electronic connection with power supplies 115 that provide logic power and heater power to the system. In some embodiments, the electronic features may be operably linked to any suitable external device. An advantageous feature of the systems of the present disclosure is a cartridge 150, referred to in this embodiment as a "disposable dosing tray with integrated heaters". Illustrated here is a first surface of the cartridge that provides an integrated array of heaters, herein labeled as "Heater 1 through Heater n". The number of heaters in the array is intended to be a flexible feature and will depend upon the particular application(s) of the system. The cartridge also supports the deposits of matter to be vaporized and inhaled, which are referred to as "concentrate aliquots". The concentrate aliquots may be deposited, or "printed", on the first surface or, in other embodiments, on a second surface of the cartridge. Each individual heater in the integrated array may be thermally coupled to a single concentrate aliquot. Thus, the system of the present disclosure offers the advantage of individually addressable concentrate aliquots, providing single metered doses of vaporized concentrate during use.

The cartridges of the present disclosure can be easily and safely inserted into and removed from the device by the user. The cartridge includes an edge connector 160 that provides a robust interface to ensure proper alignment of the cartridge during insertion. The skilled artisan will appreciate that additional alignment and registration features may be built into the interface between the cartridge and the electronic features. Through heater selection logic 125, the processor controls individual heaters within the heater array. In certain embodiments, the heater logic may include a MOSFET transistor array with each element enabled with a software controlled GP10 line from the processor. The cartridge may also include a machine-readable label, e.g., RFID tag 155. The RFID tag enables the electronic system to identify specific cartridge features and deliver the appropriate power profiles to the heaters in the array. In some embodiments, for example, a cartridge may provide different types of concentrates that each have unique optimal heating profiles for efficient vaporization. By reading the tag and accessing stored information regarding the specific concentrates, the electronics can deliver the ideal heating profiles (i.e., the specific temperature profile over time) at specific heater regions. The user interface includes the features allowing the user to control the system, including, but not limited to, a display, LEDs, and, advantageously, Bluetooth capability to operably link the system to, e.g., a cell phone app.

Figure 2A:
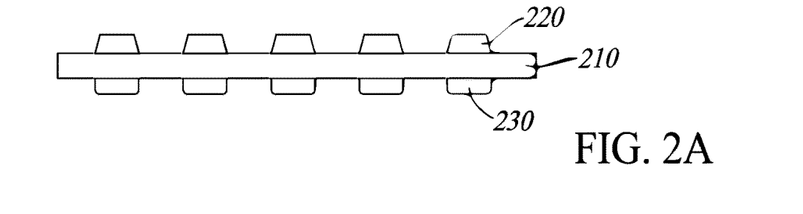
FIGS. 2A-2C illustrate side, top, and bottom views, respectively, of one embodiment of a cartridge of the present disclosure.
Figure 2B:
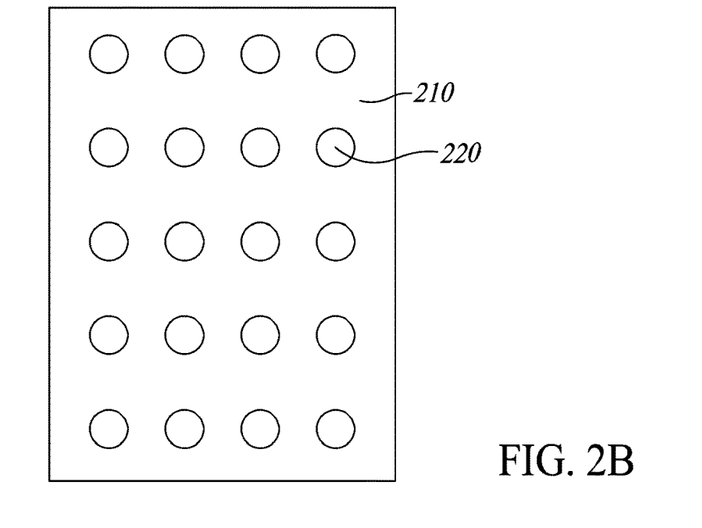
Figure 2C:
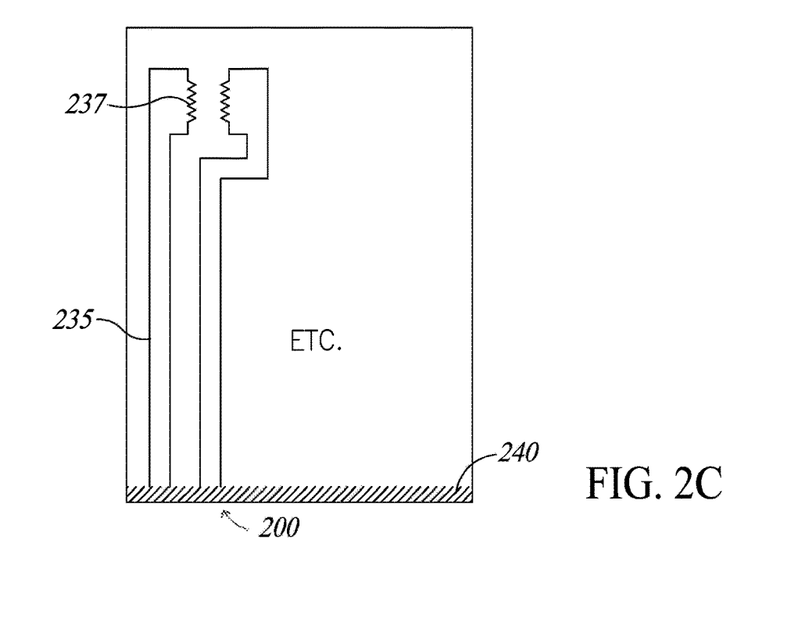

FIGS. 2A-2C show side, top, and bottom views, respectively, of one embodiment of a single-use (i.e., disposable) cartridge 200 of the present disclosure, illustrating further details. In this embodiment, the cartridge is formed from a ceramic substrate 210. Ceramic is a preferred substrate material due to, e.g., its ability to withstand high thermal loads, its electrical insulation properties, its inertness, and its biocompatibility; however other substrate materials may also be suitable for the practice of the present disclosure. A first, or "top", face supports concentrate aliquots 220, and a second, or "bottom" face provides integrated heaters 230. As shown in FIG. 2A, the aliquots are arranged such that each aliquot is positioned directly opposite a single heater, i.e., the array of aliquots is in precise alignment with the array of heaters. The cartridges of the present disclosure therefore provide the user with the distinct advantage of being able to individually address specific doses of concentrate.

In the embodiment depicted in FIG. 2B, the cartridge provides a 4×5 array of concentrate aliquots. However, the skilled artisan will readily appreciate that any alternative number of aliquots could be supported on a substrate of the disclosure, as long as each individual aliquot is in alignment with a single heater. In one embodiment, an array of around 100 concentrate aliquots is accommodated by a cartridge conveniently sized with dimensions similar to those of a conventional stick of gum. In various embodiments, each aliquot may be a unique type or amount of concentrate, or they could all be identical or mixtures of similar and different amounts and types of concentrates. Such flexibility allows distinct advantages over prior art vaporization systems, by, e.g., enabling the user to "customize" his or her vaporization regimen. In situations where the concentrates are medicinal and subject to prescription drug laws, a physician may conveniently customize doses for a cartridge on-line and have the product shipped to the patient. In some embodiments, the mass of the material in each aliquot is in the range from about 0.01 to about 0.1 grams, but it is to be understood that the cartridges of the present disclosure are not intended to be limited to any particular amount of concentrate material. However, it is to be understood that any properties of the concentrate aliquots can be ascertained by the user, including, but not limited to, the dose of concentrate material in the aliquots, the volume of the aliquots, and the percentage of one or more active ingredients in the aliquots.

FIG. 2C depicts the bottom surface of a cartridge substrate with integrated heaters including addressable platinum heater traces 235, resistive heater zones 237, and edge connector 240. To simplify the illustration, only two heaters are depicted, though it will be understood that the total number of heaters will correspond to the number of concentrate aliquots in the array. Platinum is known to be an advantageous metal for use in resistance temperature detectors (RTD) for temperature sensing due to its high temperature coefficient of resistance. Conversely, platinum RTDs can be used as accurate heaters for the same reason. Because the temperature/resistance relationship of platinum is well characterized, it is possible to drive a platinum element to a resistance corresponding to a target temperature. Advantageously, because the heater element also serves as the temperature sensor, additional sensors are not required for closed loop control in the systems of the present disclosure.

It is to be understood that other metals may be suitable materials for the heaters of the disclosure, including, but not limited to copper, nichrome, nickel, silver, gold, stainless steel, tungsten, iron, constantan, tantalum, and alloys thereof. In other embodiments, the heaters may be formed of a semiconductor material.

By measuring the voltage and current applied to each platinum heater, the systems of the present disclosure can measure the resistance and calculate the temperature. In certain embodiments, heater power can be applied via a variable voltage or a fixed voltage with pulse-width modulation (PWM), with adjustments calculated by a PID or similar control loop using heater resistance as the process variable.

Unlike precision platinum RTDs, which are typically trimmed for a certain resistance at nominal temperature (e.g., 100 ohms at 25 degrees C.), the systems of the present disclosure can self-calibrate each heater. This provides the advantages of a much wider range of nominal heater resistances and reduces the cost of production. The heaters of the present disclosure can be calibrated at a single ambient temperature before use. By measuring the heater resistance at ambient temperature and applying the known coefficient of resistance, the target resistance for driving the heater can be calculated for each heater element individually.

By arranging platinum heaters in an array, the systems of the present disclosure enable energization of one heater at a time by using external switches, e.g., MOSFETS, to direct the current to a single target only. The entire array can be controlled by a single heater driver by utilizing a common bus on one side of the heater elements, with the external switches providing the return path. In other embodiments, multiple heater drivers may also be used if it would be suitable for the heater layout or to enable a larger number of heaters on a single array.

Figure 4:
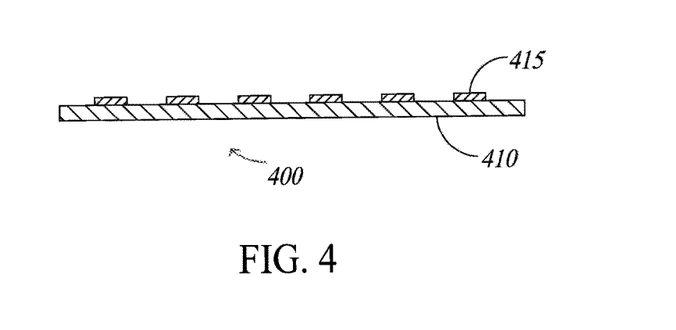
FIG. 4 illustrates a side view of one embodiment of a cartridge of the present disclosure.

In some embodiments of the present disclosure, the concentrate aliquots are deposited directly on the platinum heater traces for a more direct coupling to the heat source, as described further with reference to FIG. 4.

Figure 3A:
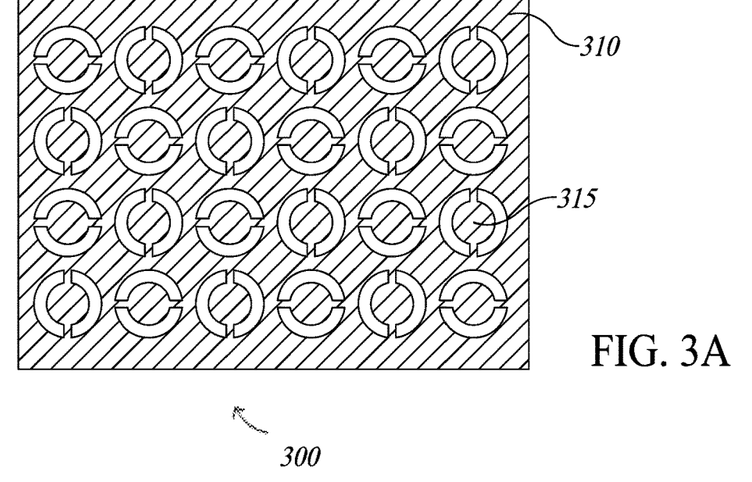
FIGS. 3A-3C illustrate top, bottom, and sectional side views, respectively, of one embodiment of a cartridge of the present disclosure.
Figure 3B:
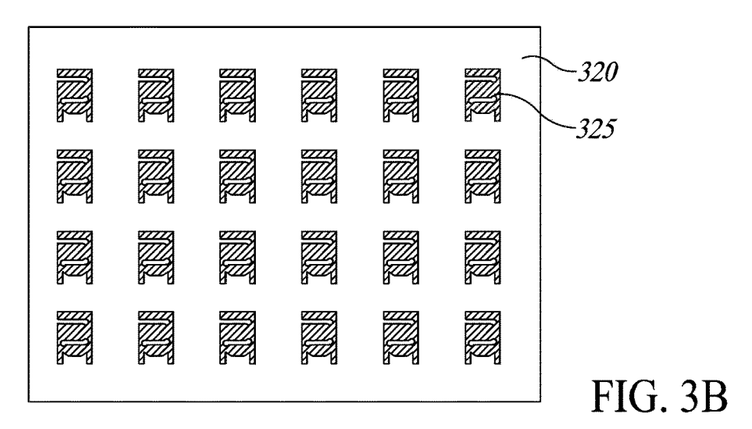
Figure 3C:
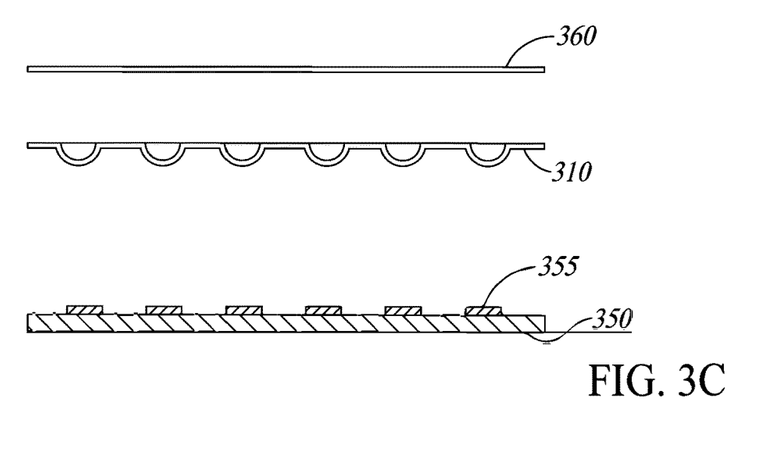

According to certain embodiments of the present disclosure, the cartridge may also include containment features to isolate individual concentrate aliquots from neighboring aliquots. These features advantageously prevent cross-contamination of single doses of material to be vaporized during heating. In some embodiments, the containment features provide air gaps between adjacent aliquots to establish thermal isolation (e.g., thermal insulation) of each aliquot. In other embodiments, thermal insulation of concentrate aliquots may be provided by a high thermal resistance path formed by a thermally resistant material and/or a thermally resistance substrate geometry. FIGS. 3A-3C depict alternate views of a cartridge 300 with containment features. In this embodiment, the cartridge is a composite formed from a stack of different layers. FIG. 3A shows a first surface of a first layer 310 of the cartridge, including a plurality of containment features 315, which are depressions, or wells, that are formed in the layer substrate. The substrate may be formed of a ceramic material that can be laser-cut to form wells, or, in other embodiments, a metal material that can be stamped or laser-etched to form wells. Concentrate aliquots are deposited into the wells and are thus physically isolated from material in all other wells. FIG. 3B shows a second surface 320 of the first layer including a plurality of heaters 325. This surface may also include an RFID tag attached to identify the dose and other characteristics of the material deposited in each well. FIG. 3C illustrates one embodiment of stacked layers forming the cartridge. As described, the first layer 310 supports the concentrate aliquots in containment features. A second layer 350 provides a ceramic substrate with an integrated array of a plurality of platinum heaters 355. An optional third layer 360 may include a "micro-perf" foil layer (e.g., a vapor permeable layer) that functions to enclose and isolate the concentrate aliquot matter in the wells from the atmosphere. In use, vapor is released through the perforations and enters an air stream for inhalation by the user.

FIG. 4 illustrates an alternative embodiment of a cartridge 400 of the present disclosure with an integrated heater array including a plurality of individual heaters 410. In this embodiment, the concentrate material is deposited in a plurality of aliquots 415 with each individual aliquot directly deposited on the surface of a single heater. This cartridge may optionally be enclosed in a foil package to protect the contents and prevent contamination during shipping and prior to use. In other embodiments, the cartridge may include additional layers to provide, e.g., heat spreading features to thermally isolate different heating regions.

Figure 5:
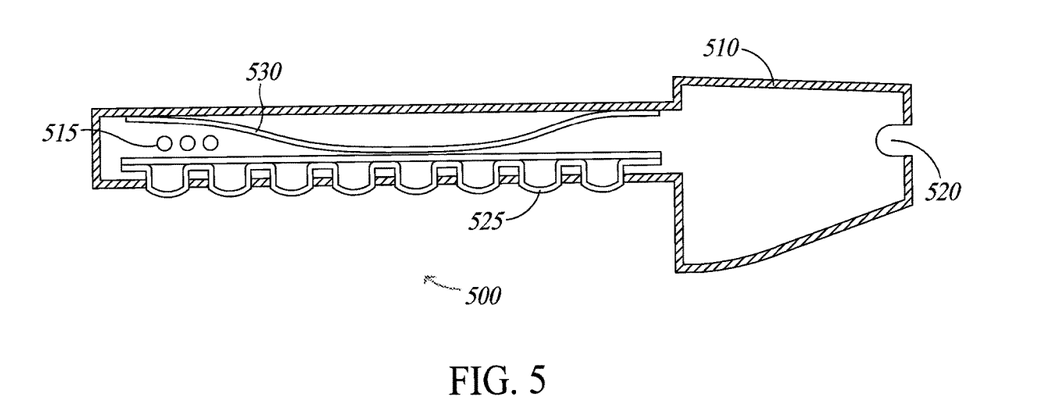
FIG. 5 depicts a cross-sectional side view of one embodiment of a cartridge of the present disclosure.

FIG. 5 illustrates yet another embodiment of a cartridge 500 of the present disclosure, which includes a hollow housing 510 that may be referred to as a "mouth piece". Air vents 515 formed in a distal end of the housing and a mouth opening 520 formed in a proximal end of the housing provide a path for air to flow through the mouth piece during use. Dose array 525 provides the array of concentrate aliquots for vaporization. In certain embodiments, intimate contact of the aliquots to the heater array may be established by a spring 530, though the skilled artisan will appreciate that other means or devices for establishing contact are suitable for the practice of the present disclosure.

Figure 6A:
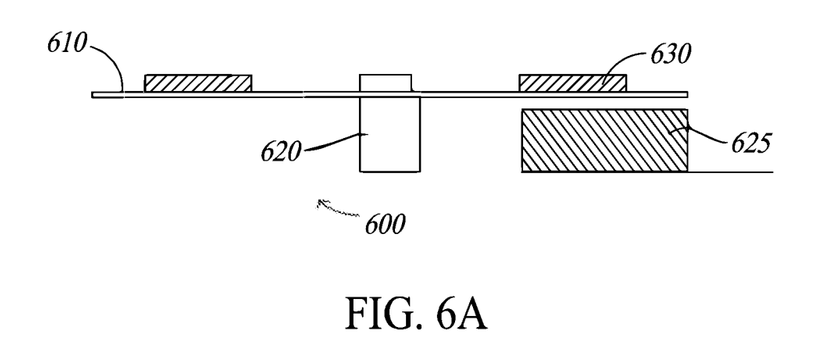
FIGS. 6A and 6B depict side and top views, respectively, of one embodiment of a system of the present disclosure.
Figure 6B:
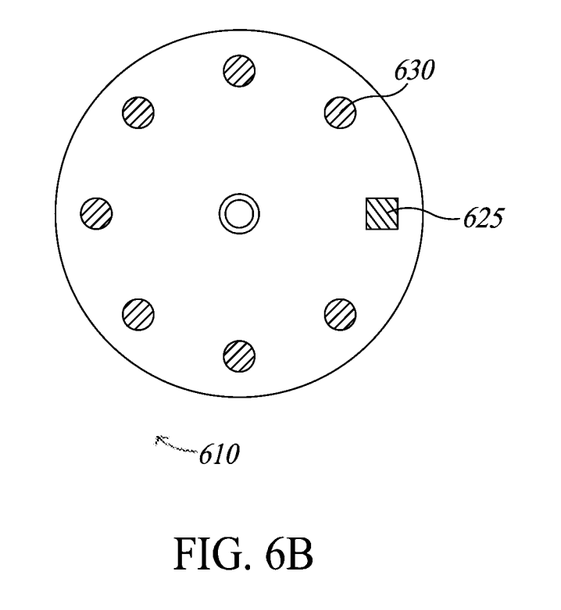

The basic features of one embodiment of a system of the present disclosure are summarized in FIGS. 6A and 6B. Here, system 600 includes cartridge 610 that can be rotated, or otherwise moved, in relation to a device 620. The device includes a single fixed heater 625 that thermally couples with a single concentrate aliquot 630 on the cartridge. As shown in FIG. 6B, the cartridge 610 may be circular in shape and formed as a disc to rotate the plurality of concentrate aliquots to sequentially thermally couple a single aliquot 630 with fixed heater 625. In operation, the cartridge is rotated following vaporization of a selected concentrate aliquot to introduce a new aliquot for heating and vaporization. Other configurations are also contemplated by the present disclosure, for example, in some embodiments, the cartridge may have a rectilinear shape with an array of concentrate aliquots deposited in a linear pattern. In operation, the cartridge is moved within the device in a linear direction to position any of the aliquots in thermal connection with the heater.

FIGS. 7-10 illustrate alternative embodiments of a vaporization system of the present disclosure with various configurations of electronic elements and cartridge features. In operation, the user will simply insert a cartridge into the base device, activate the heater corresponding to the desired aliquot(s), and inhale. In some embodiments, the user interaction may be mediated by a mobile app, which enables the user to select the desired doses or type of concentrate material.

Figure 7A:
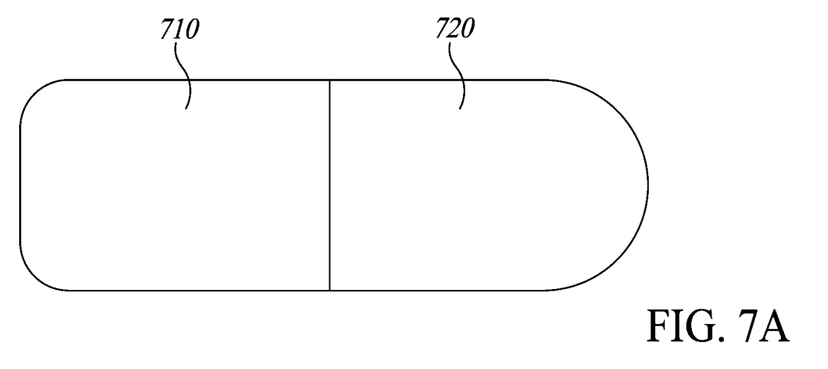
FIGS. 7A-7C depict a top view with covers, a top view without covers, and a cross-sectional side view, respectively, of one embodiment of a device of the present disclosure.
Figure 7B:
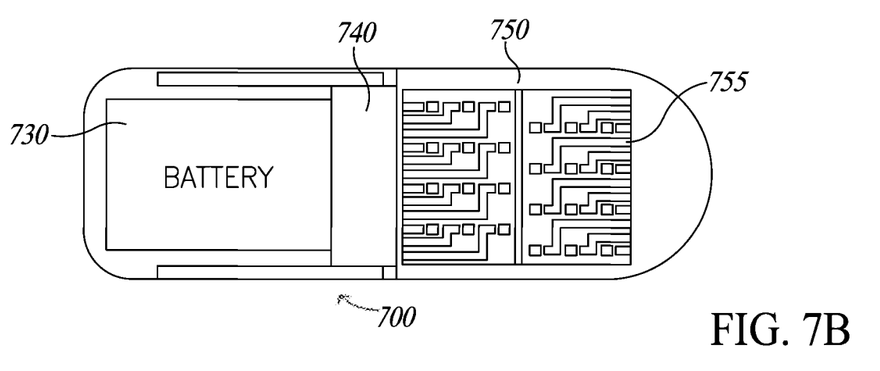
Figure 7C:
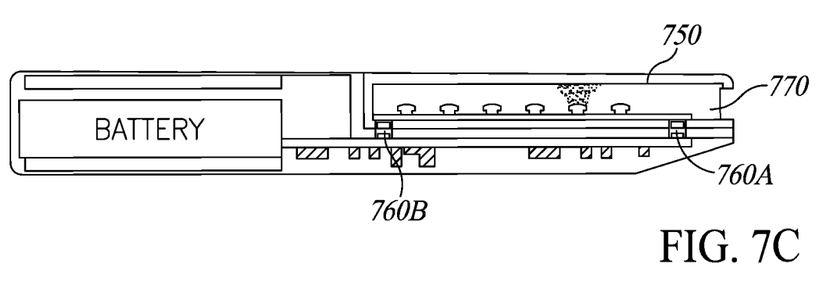

With reference to FIGS. 7A-7C, there are shown different views of a vaporization system 700. Illustrated in FIG. 7A is a top view of the system enclosed in a plastic housing. The housing may include one or more detachable and removable parts, or covers, 710 and 720 to enable insertion and removal of cartridges and/or access to various interior electronic components. FIG. 7B is the same top view with the detachable housing parts removed to reveal a battery 730, a PCB 740, and a cartridge 750 with integrated heaters 755, which is provided in the form of a hollow mouthpiece, as described with reference to FIG. 5. In this embodiment, the cartridge provides an array of 24 individual heaters, but the disclosure is not intended to be limited to this particular array, as described herein. The cartridge may be introduced into the device by any device or means that provides a precise mechanical and/or electrical connection at the cartridge/device interface while providing ease of use and tactile and/or audible feedback to inform the user of correct insertion. In this embodiment, the cartridge is top-loaded into the device. In some embodiments, the cartridge may be introduced into the device with a leading edge that snaps into place and/or magnets to secure the cartridge in place. FIG. 7C shows a cross-sectional side view of the system, illustrating the interior features of the cartridge. In this embodiment, the heaters are integrated in the cartridge and require electrical connection with the device provided by connectors 760A and 760B. The cartridge also provides an air path 770 to form a conduit for the vaporized material to flow from the volatilized concentrate aliquot to the user's mouth.

Figure 8A:
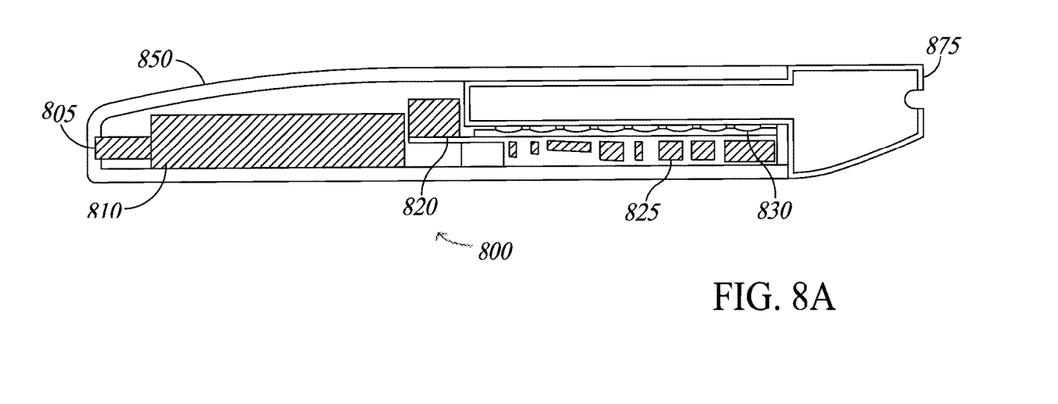
FIGS. 8A-8C depicts a cross-sectional side view of one embodiment of a device of the present disclosure, a top view of one embodiment of an unassembled cartridge of the present disclosure, and a top view of one embodiment of an assembled cartridge of the present disclosure, respectively.
Figure 8B:
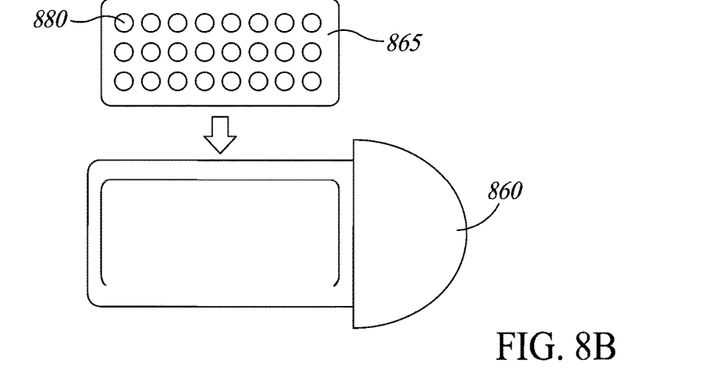
Figure 8C:
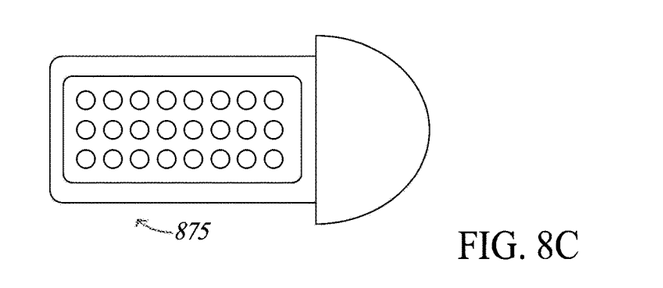

FIGS. 8A-8C depict an alternative embodiment of a vaporization system 800 of the present disclosure including device 850 and air path cartridge 875. The device includes battery 810 that may be rechargeable using a standard USB connector 805. A PCB 820 includes components 825 that are operably coupled to an array of heaters 830, which in this embodiment, are integrated in the device and are thus reusable. In this configuration, establishment of a mechanical connection is all that is required at the interface between the heater array and the cartridge. FIG. 8B shows details of the air path cartridge 875. In this embodiment, the cartridge includes a dose package carrier 860 that is reusable housing providing the path, as described with reference to FIG. 5. The user inserts a disposable dose package 865 that provides an array of concentrate aliquots 880. In this embodiment, the user may slide the loaded cartridge, illustrated in FIG. 8C, into the side of the device housing. The used cartridge may be removed similarly by manual means or devices, or in other embodiments, may be ejected by mechanical means or devices. In some embodiments, the cartridge may be enclosed in a foil dose cover that interfaces with the heaters. In use, the foil cover is perforated to release vaporized concentrate material into the air stream.

Figure 9:
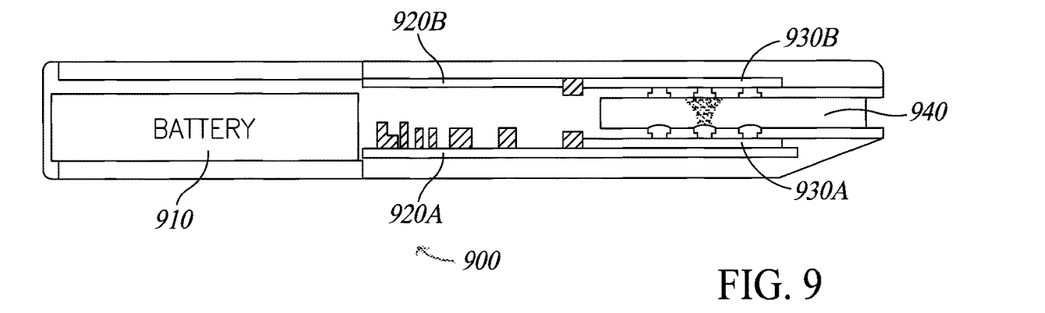
FIG. 9 depicts a cross-sectional side view of one embodiment of a system of the present disclosure.

FIG. 9 illustrates a cross-sectional side view of another embodiment of the vaporization system of the present disclosure. Here, system 900 includes a battery 910 operably linked to PCBs 920A and 920B. Heater arrays 930A and 930B are integrated in the device in a "stacked" configuration, advantageously enabling the device to couple with two arrays of concentrate on two opposing interior surfaces of the cartridge 940. In other embodiments, the heater arrays may be stacked in a vertical orientation or any other suitable 3D configuration.

Figure 10A:
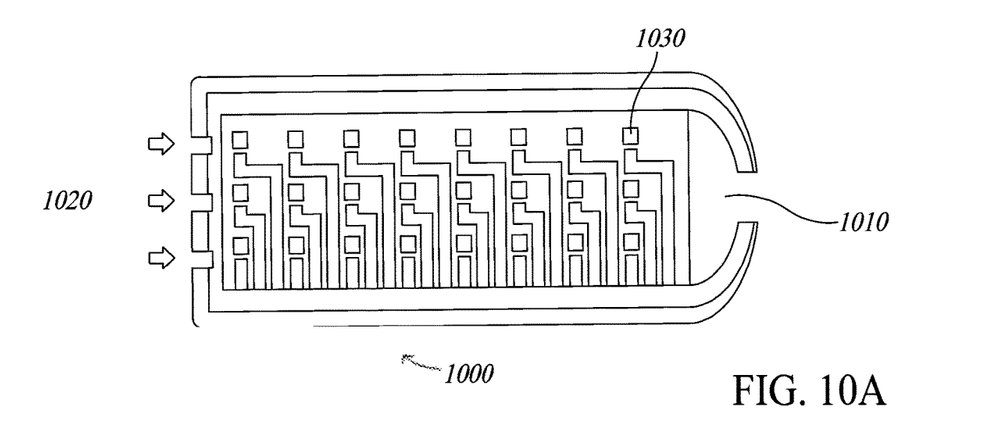
FIGS. 10A and 10B depict cross-sectional bottom and side views, respectively, of one embodiment of a system of the present disclosure.
Figure 10B:
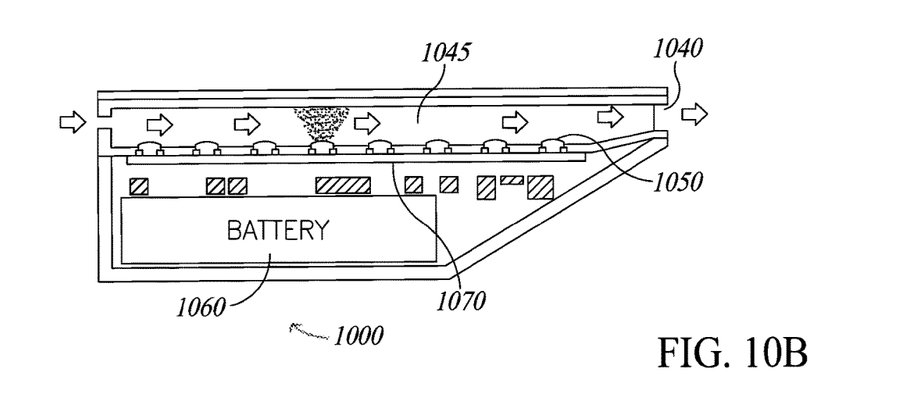

FIGS. 10A and 10B depict cross-sectional top and side views, respectively, of another embodiment of a vaporization system 1000 of the present disclosure. FIG. 10A shows a mouthpiece 1010 formed as an opening in the housing of the device. Air enters the device through air inlets 1020 formed as openings in the housing on the opposite side of the device relative to the mouthpiece. In this embodiment, an array of 24 heaters 1030 is integrated into the device, though the skilled artisan will appreciate that the array may provide any suitable alternative number of heaters. FIG. 10B shows the interior features of the system with a cartridge 1040 providing an array 1050 of concentrate aliquots and an air path 1045. The cartridge is delivered to the user in a perforated foil sealed pouch, which prevents leakage of the concentrate aliquot material, but permits the release of vapor into the airstream of the system during use. In this embodiment, the electronic components of the system are provided in a stacked configuration, with a battery 1060 supporting the device on a bottom surface and contacting a first surface of a PCB 1070 with the integrated array of heaters contacting a second surface of the PCB.

This application claims the benefit of priority to U.S. Provisional Application No. 62/630,753, filed Feb. 14, 2018, which application is hereby incorporated by reference in its entirety.

It is appreciated that aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system for vaporization of plant derived concentrates, the system comprising:
   a base device comprising electronic features;
   only a single heater; and
   a cartridge removably coupleable to the base device, the cartridge comprising an array of concentrate aliquots and a machine-readable label, wherein each concentrate aliquot of the array is addressable by the heater and wherein each concentrate aliquot is located on an opposing face of the cartridge from the heater and the aliquots are not fluidly connected.

2. The system of claim 1, wherein the cartridge is formed in a disc shape and the array of concentrate aliquots is formed in a circular pattern.

3. The system of claim 1, wherein the cartridge is configured to be rotated to position any one of the concentrate aliquots in thermal connection with the heater.

4. The system of claim 1, wherein the cartridge is formed in a rectilinear shape and the array of concentrate aliquots is provided in a linear pattern on the cartridge.

5. The system of claim 4, wherein the cartridge is configured to be moved in a linear direction to position any one of the concentrate aliquots in thermal connection with the heater.

6. The system of claim 1, wherein the machine-readable label identifies a dose and characteristic of each concentrate aliquot.

7. The system of claim 1, wherein the heater is formed of a metal, metal alloy, or a semiconductor.

8. The system of claim 1, wherein the heater is configured for precise temperature control by measuring an applied voltage and current, wherein the applied voltage and current are used to calculate a resistance, and wherein the resistance corresponds to a calculable temperature based upon a known or measured temperature coefficient of resistance of a material of the heater.

9. The system of claim 1, wherein the cartridge further comprises a vapor permeable cover.

10. The system of claim 1, wherein the electronic features of the base device provide a heating profile for vaporizing each of the concentrate aliquots of the array, wherein the heating profiles comprise time and temperature instructions provided to the heater.

11. The system of claim 1, wherein each of the concentrate aliquots is thermally insulated from adjacent concentrate aliquots.

12. The system of claim 11, wherein the thermal insulation is provided by an air gap.

13. The system of claim 11, wherein the thermal insulation is provided by a high thermal resistance path comprised of a thermally resistant material and/or a thermally resistant substrate geometry.

\* \* \* \* \*